(12) United States Patent
Avril et al.

(10) Patent No.: US 9,988,166 B2
(45) Date of Patent: Jun. 5, 2018

(54) PACKAGING MACHINE AND METHOD OF PACKAGING ARTICLES

(71) Applicant: MeadWestvaco Packaging Systems, LLC, Richmond, VA (US)

(72) Inventors: Fabrice Avril, Chateauroux (FR); Frederic Limousin, Le Poinconnet (FR); Jean-Christophe Bonnain, Chaeauroux (FR)

(73) Assignee: WestRock Packaging Systems, LLC, Atlanta, GA (US)

( * ) Notice: Subject to any disclaimer, the term of this patent is extended or adjusted under 35 U.S.C. 154(b) by 453 days.

(21) Appl. No.: 14/427,891

(22) PCT Filed: Sep. 26, 2013

(86) PCT No.: PCT/US2013/061800
§ 371 (c)(1),
(2) Date: Mar. 12, 2015

(87) PCT Pub. No.: WO2014/052517
PCT Pub. Date: Apr. 3, 2014

(65) Prior Publication Data
US 2015/0210414 A1 Jul. 30, 2015

(30) Foreign Application Priority Data
Sep. 29, 2012 (GB) .................................. 1217466.0

(51) Int. Cl.
*B65B 35/56* (2006.01)
*B65G 47/244* (2006.01)
(Continued)

(52) U.S. Cl.
CPC .............. *B65B 35/56* (2013.01); *B65B 21/00* (2013.01); *B65B 35/58* (2013.01); *B65B 57/16* (2013.01);
(Continued)

(58) Field of Classification Search
CPC ....... B65B 35/56; B65B 35/58; B65B 21/242; B65B 21/00; B65B 21/04; B65G 4/244;
(Continued)

(56) References Cited

U.S. PATENT DOCUMENTS

| 2,614,681 A | * | 10/1952 | Keil ......................... B65C 9/04 |
| | | | 156/DIG. 26 |
| 2,798,603 A | * | 7/1957 | Grinspoon ............. B65D 71/16 |
| | | | 206/140 |

(Continued)

FOREIGN PATENT DOCUMENTS

| DE | 3728291 | 3/1989 |
| EP | 1584559 | 10/2005 |

(Continued)

OTHER PUBLICATIONS

International Search Report from PCT/US2013/061800.

*Primary Examiner* — Stephen F Gerrity
*Assistant Examiner* — Joshua Kotis
(74) *Attorney, Agent, or Firm* — WestRock Intellectual Property Group

(57) ABSTRACT

A packaging machine comprising an orientation system for orientating an article within a package, the orientation system comprising at least one carriage (240) moveable about an endless path comprising a working reach and a return reach, a drive mechanism for propelling the at least one carriage about the endless path, an engagement member (250) for frictionally engaging with an article (B) in a package (1), the engagement member moveable between an engaged position and a disengaged position wherein the engagement member is rotationally driven by a rotary drive mechanism comprising a first component (244) rotationally mounted to the carriage and a second component (234) which engages with the first component such that the first (Continued)

component rotates as the carriage is driven about the endless path.

19 Claims, 8 Drawing Sheets

(51) Int. Cl.
    *B65B 21/00*     (2006.01)
    *B65B 35/58*     (2006.01)
    *B65B 57/16*     (2006.01)

(52) U.S. Cl.
    CPC .... *B65G 47/244* (2013.01); *B65G 2201/0244* (2013.01)

(58) Field of Classification Search
    CPC ....... B65G 47/2445; B65C 9/06; B65C 9/062; B65C 9/065; B65C 9/067; B65C 9/04; B65C 9/045; F16H 2001/289; F16H 3/097; F16H 3/36; F16H 3/366
    USPC ....... 198/390, 394, 395, 401, 413, 384–388, 198/393; 53/446, 544
    See application file for complete search history.

(56) References Cited

U.S. PATENT DOCUMENTS

| | | | |
|---|---|---|---|
| 3,811,553 A * | 5/1974 | Riggs | B07C 5/122 198/379 |
| 3,938,653 A * | 2/1976 | Senger | B07C 5/122 198/379 |
| 4,051,366 A | 9/1977 | Gordon | |
| 4,164,281 A * | 8/1979 | Schnier | B65G 47/244 198/394 |
| 4,207,974 A * | 6/1980 | Dragotta | B65G 17/24 198/377.01 |
| 4,981,205 A * | 1/1991 | Cowlin | A23N 3/00 198/384 |
| 5,074,399 A * | 12/1991 | Kettle | B65B 35/58 198/379 |
| 5,608,516 A * | 3/1997 | Emery | G01N 21/9009 250/223 B |
| 6,148,989 A * | 11/2000 | Ecker | A23N 15/00 118/24 |
| 2003/0047475 A1* | 3/2003 | Arends | B65B 21/04 206/427 |
| 2009/0218193 A1* | 9/2009 | Malini | B65B 35/58 198/379 |
| 2010/0192515 A1* | 8/2010 | Chalendar | B65B 21/02 53/396 |
| 2010/0264058 A1* | 10/2010 | Krause | B65B 5/024 206/745 |
| 2010/0290695 A1* | 11/2010 | Kwirandt | B65C 9/067 382/142 |

FOREIGN PATENT DOCUMENTS

| | | |
|---|---|---|
| GB | 2441991 | 3/2008 |
| WO | WO 2005/085103 | 9/2005 |
| WO | WO 2008/036745 | 3/2008 |
| WO | WO2013109849 | 7/2013 |

\* cited by examiner

PACKAGING MACHINE AND METHOD OF PACKAGING ARTICLES

CROSS-REFERENCE TO RELATED APPLICATIONS

This application is a National Phase application of PCT Application No. PCT/US13/061800, filed Sep. 26, 2013, which claims the benefit of UK Priority Application No. 1217466.0, filed Sep. 29, 2012, which is incorporated herein by reference in its entirety.

FIELD OF THE INVENTION

The present invention relates to a packaging machine and a method of packaging articles, more specifically, but not exclusively to an apparatus and method of orientating an article within a package.

BACKGROUND OF THE INVENTION

In the field of packaging it is often required to provide consumers with a package comprising multiple primary product containers, such multi-packs are desirable for shipping and distribution and for display of promotional information. For cost and environmental considerations, such cartons or carriers need to be formed from as little material as possible and cause as little wastage in the materials from which they are formed as possible. Another consideration is the strength of the packaging and its suitability for holding and transporting large weights of articles.

Packages may be provided with a display window through which a portion of an article may be visible, it desirable to place the displayed article in particular orientation for presentation to a consumer or to hide information, for example a bar code which is only relevant to an individual article provided within a multi-pack. It is further desirable to automate packaging of articles within a carton.

The present invention seeks to overcome or at least mitigate the problems of the prior art.

SUMMARY OF INVENTION

According to a first aspect of the present invention there is provided a packaging machine comprising an orientation system for orientating an article within a package, the orientation system comprising:
  at least one carriage, the at least one carriage being moveable about an endless path, the endless path comprising a working reach and a return reach;
  a drive mechanism for propelling the at least one carriage about the endless path;
  an engagement member for frictionally engaging with an article in a package, the engagement member being moveable between an engaged position and a disengaged position;
  wherein the engagement member is rotationally driven by a rotary drive mechanism comprising;
    a first component rotationally mounted to the carriage; and
    a second component;
  wherein the second component engages with the first component such that the first component rotates as the carriage is driven about the endless path.
Preferably, the orientation system comprises a controller coupled to a sensor for collecting information concerning the orientation of an article in a package and coupled to an actuator for moving the engagement member between the engaged position and the disengaged position.

The controller may comprise: a memory device for storing reference information about an article, and a processor for comparing the information from the sensor with the reference information.

In some embodiments, the controller comprises calculator for calculating a parameter indicative of an angle through which an article disposed within in a package is required to be rotated in order to place the article in a predefined orientation.

The parameter may be one of the following:
  a time period for which the engagement member is to be engaged with an article;
  a distance for which the engagement member is to be engaged with an article;
  an angle through which an article in a package is required to be rotated;
  a number of rotations of the engagement member.

Optionally, the drive mechanism comprises a chain or belt driven by an electric motor via a drive wheel or sprocket.

The drive mechanism may comprise an electric motor mounted to the carriage and coupled to the first component of the rotary drive mechanism.

Optionally, the engagement member comprises a friction wheel mounted upon a swing arm which is pivotally coupled to the carriage.

In some embodiments, the actuator is pivotally coupled at one end to the swing arm and is pivotally coupled at a second opposing end to the carriage.

Preferably, the actuator comprises a piston and a cylinder.

Optionally, the piston is coupled to the swing arm and the cylinder is coupled to the carriage.

Optionally, the cylinder is a single acting cylinder.

The cylinder may comprise a biasing device for biasing the piston towards a retracted position within the cylinder.

Alternatively, the cylinder is a double acting cylinder for driving the piston from a retracted to and extended position and from the extended position to the retracted position.

The piston and cylinder may be driven pneumatically, hydraulically or electrically.

In some embodiments, the second component of the rotary drive mechanism comprises a chain, toothed belt or surface such as a rack.

Preferably, the first component of the rotary drive mechanism comprises a sprocket or gear wheel, or friction wheel for engaging with the second component of the rotary drive mechanism.

Optionally, the engagement member is coupled to the first component of the rotary drive mechanism by at least one pair of gear wheels such that a direction of rotation of the engagement member is opposite to a direction of rotation of the first component of the rotary drive mechanism.

In some embodiments, the packaging machine comprises a learning station coupled to the controller, wherein the learning station comprises a recorder for recording the appearance of at least some of the article.

Preferably, the learning station comprises a rotation platform for rotating the article through at least one full rotation whilst recording an image of the article.

According to a second aspect of the present invention there is provided a method of orientating articles within a package comprising:
  transferring a package including at least one article disposed therein upon a conveyor determining the orientation of an article disposed within a package;

comparing the orientation of the article disposed within the package to reference information concerning the article;

determining that the article requires rotation to place the article in a predefined desired orientation;

bringing an engagement member into contact with the article whilst transferring the package upon the conveyor, rotating the engagement member whilst in contact with the article as to rotate the article within the package;

maintaining the engagement member in contact with the article along a working reach of the conveyor until the article is in the predefined desired orientation;

disengaging the engagement member from a contacting relationship with the article.

The method of orientating articles within a package may comprise:

locking the orientation of the article within the package.

Preferably, locking the orientation of the article within the package comprises:

engaging a first tab with a radially extending protrusion provided on a first side of the article; and engaging a second tab with a radially extending protrusion provided on a second opposing side of the article.

Alternatively, locking the orientation of the article within the package comprises:

engaging at least one tab within a radially extending recess or between a pair of radially extending protrusions provided on the article.

In some embodiments the method comprises:

calculating a parameter indicative of an angle through which an article in a package is required to be rotated in order to place the article in a predefined orientation.

The parameter may be one of the following:

a time period which the engagement member is engaged with an article;

a distance for which the engagement member is engaged with an article;

an angle through which an article in a package is required to be rotated;

a number of rotations of the engagement member.

The method of orientating articles within a package may comprise:

controlling the engagement member to engage with the article in accordance with the calculated parameter.

In some embodiments the method comprises:

monitoring the orientation of the article within the package whilst the article is being rotated, sensing an alignment feature provided on the article, instructing the engagement member to disengage from contacting relationship with the article.

The method of orientating articles within a package may comprise:

learning the appearance of an article to be orientated.

Optionally, learning the appearance of an article to be orientated comprises:

recording the appearance of some or all of the article around its exterior, defining a desired orientation of the article.

Preferably, recording the appearance of some, or all, of the article around its exterior comprises:

rotating the article through at least one full rotation whilst capturing an image of the article.

Optionally, learning the appearance of an article to be orientated comprises:

defining one or more alignment features of the article.

Within the scope of this application it is intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which.

DETAILED DESCRIPTION OF EXEMPLARY EMBODIMENTS

Detailed descriptions of specific embodiments of the package, blanks and cartons are disclosed herein. It will be understood that the disclosed embodiments are merely examples of the way in which certain aspects of the invention can be implemented and do not represent an exhaustive list of all of the ways the invention may be embodied. As used herein, the word "exemplary" is used expansively to refer to embodiments that serve as illustrations, specimens, models, or patterns. Indeed, it will be understood that the packages, blanks and cartons described herein may be embodied in various and alternative forms. The figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

The present disclosure is related to British patent application no. GB1212391.5 and to international patent application PCT/US13/022093, in the name of the same applicant and having the title "Carton and Carton Blank"; the contents of which application are incorporated herein, in its entirety, by reference.

Figure 1:
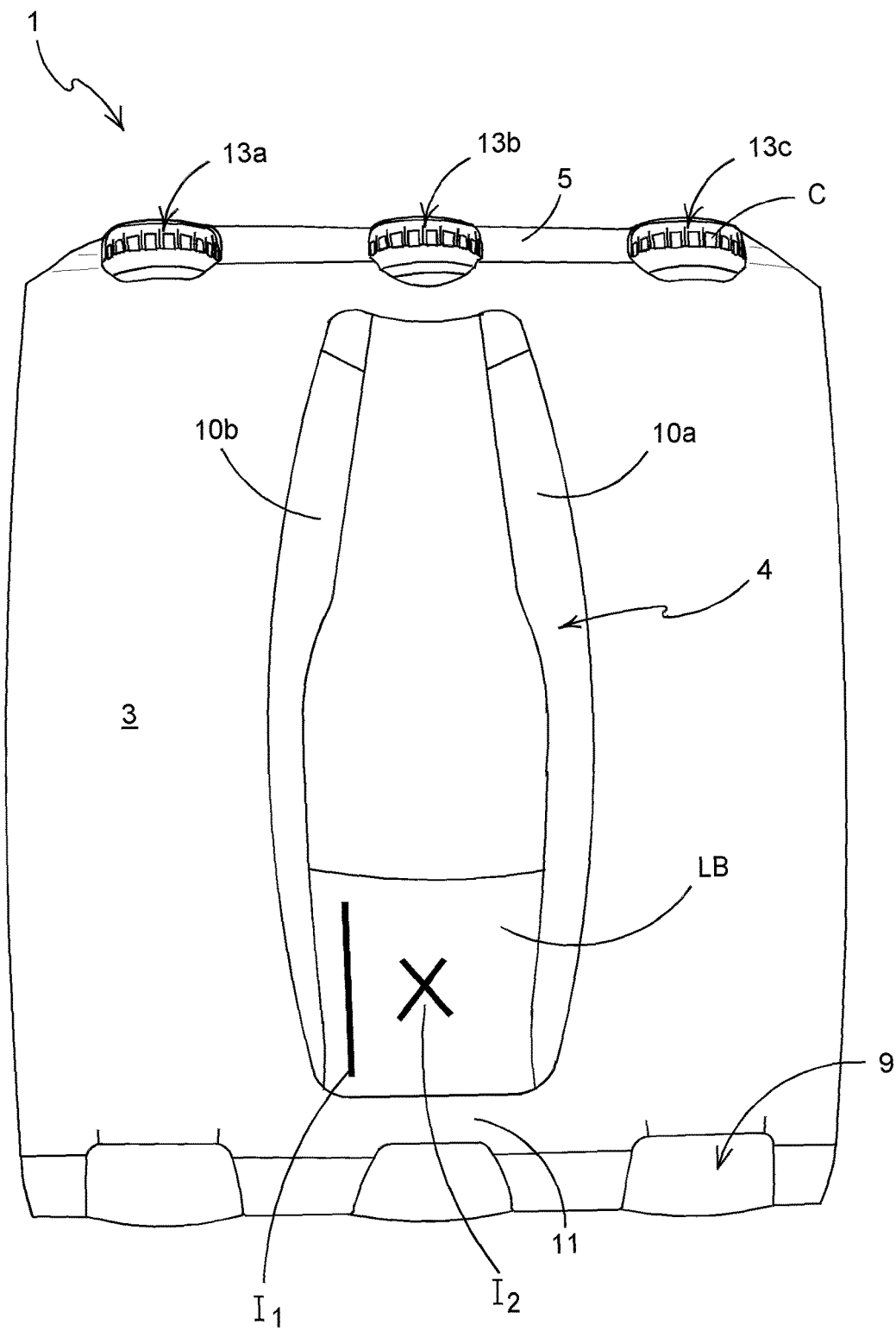
FIG. 1 is a side view of a first exemplary carton forming a package.

Referring to FIG. 1 there is shown a side view of a package 1 capable of accepting an input of primary products, such as, but not limited to, bottles or cans, hereinafter referred to as articles B.

In the embodiments detailed herein, the terms "carton" and "carrier" refer, for the non-limiting purpose of illustrating the various features of the invention, to a container for engaging, carrying, and/or dispensing articles, such as bottles. However, it is contemplated that the teachings of the invention can be applied to various containers, which may or may not be tapered and/or cylindrical. Other exemplary articles include bottles (for example metallic, glass or plastics bottles), cans (for example aluminium cans), tins, pouches, packets and the like.

The blank is formed from a sheet of suitable substrate. It is to be understood that, as used herein, the term "suitable substrate" includes all manner of foldable sheet material such as paperboard, corrugated board, cardboard, plastic, combinations thereof, and the like. It should be recognized that one or other numbers of blanks may be employed, for example, to provide the carrier structure described in more detail below.

In the exemplary embodiment, the blank is configured to form a carton or carrier for packaging an exemplary arrangement of exemplary articles. For example, the arrangement is a matrix or array including rows and columns such as a 2×3 arrangement of articles. The blank can be alternatively configured to form a carrier for packaging other articles and/or different arrangements of articles.

Referring to FIG. 1, there is illustrated package 1 comprising a carton according to a first embodiment. The carton is formed from a blank having a linear series of panels consisting of a first bottom panel, a first bevel panel, a first side panel 3, a top panel, a second side panel, a second bevel panel and a second bottom panel hinged one to the next by fold lines.

The blank is folded to form the package 1 illustrated in FIG. 1. The first and second bottom panels are engaged with one another in at least partially overlapping relationship to form a composite bottom wall of the carton. Preferably, the bottom wall comprises a lock system formed of complementary tabs and apertures to maintain them in engagement.

The bottom wall further comprises portions of three article heel engagement structures. The article heel engagement structures extend from the bottom panel across the first bevel panel and into the first side panel 3, in-so-doing interrupting the fold lines which hinge the bottom wall, first bevel panel and first side panel 3 one to the next. Each article heel engagement structure, when in a setup condition, forms an aperture 9 defined in the bottom wall, first bevel panel and first side panel 3. Each article heel engagement structure comprises an arrangement of panels comprising a pair of gusset panels and a pair of stopper panels folded internally of the carton so as to engage with a base portion of the articles B.

The aperture 9 exposes a lower portion of each of the articles B. Preferably, the lower portion, at least in part, passes through the aperture 9 so as to stand proud of the adjacent portion of the carton.

It will be appreciated that in other embodiments the first and second bevel panels are optional, and that the first side panel 3 and second side panel may be coupled directly to the bottom wall.

The carton comprises a display window 4 having a pair of window panels 10a, 10b struck from the first side panel 3 and hinged thereto, preferably by arcuate or curved fold lines. The window panels 10a, 10b are separated from one another by a cut line, and/or optionally by an aperture.

The display window 4 extends substantially across the first side panel 3 from a lower article retention strap 11 disposed adjacent the aperture 9 of an adjacent article heel engagement structures to terminate at an upper article retention strap 12 disposed adjacent a crown aperture 13a, 13b, 13c described in more detail herein below. In the embodiment illustrated in FIG. 1 the upper article retention strap 12 and lower article retention strap 11 each engage a portion of an article B with the carton.

The carton further comprises a plurality of crown apertures 13a, 13b, 13c which, in a set up condition, receive an upper portion of an article B.

Each crown aperture 13a, 13b, 13c is struck in part from a respective one of the first side panel 3 or second side panel and in part from the top panel, so as to define an arcuate shaped tab (not shown) which extends over an uppermost portion, such as a closure C, of a respective article B which it receives.

The carton comprises an article securing structure 5 which engages with a pair of adjacent articles B. The article securing structure 5 is disposed between each pair of adjacent crown apertures 13a/13b, 13b/13c and is struck, in part from the first side panel 3. The article B which is received in the crown aperture 13b is engaged by both article securing structures 5 on opposing sides thereof.

Each article securing structure 5 comprises an engagement tab defined in part by a first fold line which extends between a pair of adjacent crown apertures 13a/13b, 13b/13c. A first cutline extends from crown aperture 13b on each of a pair of opposing sides thereof, each first cut line extends within the top panel substantially perpendicularly with respect to the fold line between the top panel and the first side panel 3. A further cutline extends from a side of a respective one of each of the crown apertures 13a, 13c adjacent to the crown aperture 13b. The side of the respective one of each of the crown apertures 13a, 13c from which the respective cutline extends is the adjacent to the crown aperture 13b.

A second fold line extends between each of the first cut lines which extends from the crown aperture 13b and a respective one of the further cut lines which extend from the crown apertures 13a, 13c.

Optionally, the first cut lines and the further cut lines terminate in curved portions, preferably a U-shaped portions, this reduces the likelihood of a tear propagating through the top panel which is initiated from the first or further cut lines. Preferably, a third fold line extends across each engagement tab; in some embodiments the third fold line is collinear with the fold line between the top panel and the first side panel 3.

Turning to the construction of carton illustrated in FIG. 1, it is envisaged that the carton can be formed by a series of sequential folding operations in a straight line machine so that the carton is not required to be rotated or inverted to complete its construction. The folding process is not limited to that described below and may be altered according to particular manufacturing requirements.

A group of articles B is assembled; in the preferred embodiment six articles B are arranged in a 2×3 array. The top panel of the blank is disposed over the group of articles B to provide a top wall of the carton. Preferably, the folding operations to assemble the article heel engagement structures are performed prior to folding the first side panel and second side panels down around the group of articles B to provide side walls of the carton.

The window panels 10a, 10b are folded inwardly of the carton such that each is interposed between a pair of adjacent articles B. Folding the window panels 10a, 10b in this manner warps or bends the first side panel 3 to which the window panels 10a, 10b are attached, this is due to the curved nature of the fold lines connecting the window panels 10a, 10b to first side panel 3. The warping of the first side panel 6 urges the window panels 10a, 10b against the article B.

The first side panel 3 and second side panel are folded down about their respective fold lines into abutment with side portions of adjacent ones of the articles B to form respectively, first and second side walls of the carton. This brings the article heel engagement structures around lower portions of the articles B and brings each of the window panels 10a, 10b into interposition between a central article B on an adjacent side of the group of articles B and a respective one its neighbouring articles B on that same adjacent side.

Upper article retention strap 12 engages an article B in the aperture created by displacement of the window panels 10a, 10b. The article retention strap 12 engages an upper portion of the article B beneath a flange or protrusion, the flange or protrusion may be provided by an article closure means C such as a crown cork. Lower article retention strap 11 engages an article B in the aperture created by displacement of the window panels 10a, 10b. Upper and lower article retention straps 12, 11 interrupt an aperture in the carton which extends from the composite base wall through the first bevel panel, through the first side wall 3 and up to the top panel. This has the advantage of exposing the substantial entirety of the outermost side of the article B disposed within the display window 4 whilst at the simultaneously retaining the article B within the carton.

The first and bottom panels are secured in overlapping relationship to provide a bottom wall of the carton.

Preferably, the ends of the carton are at least partially closable, not shown in FIG. 1, by folding end closure arrangements such that an end flap at least partially close the end of the carton the articles B are restricted or prevent from being removable therethrough.

Figure 2:
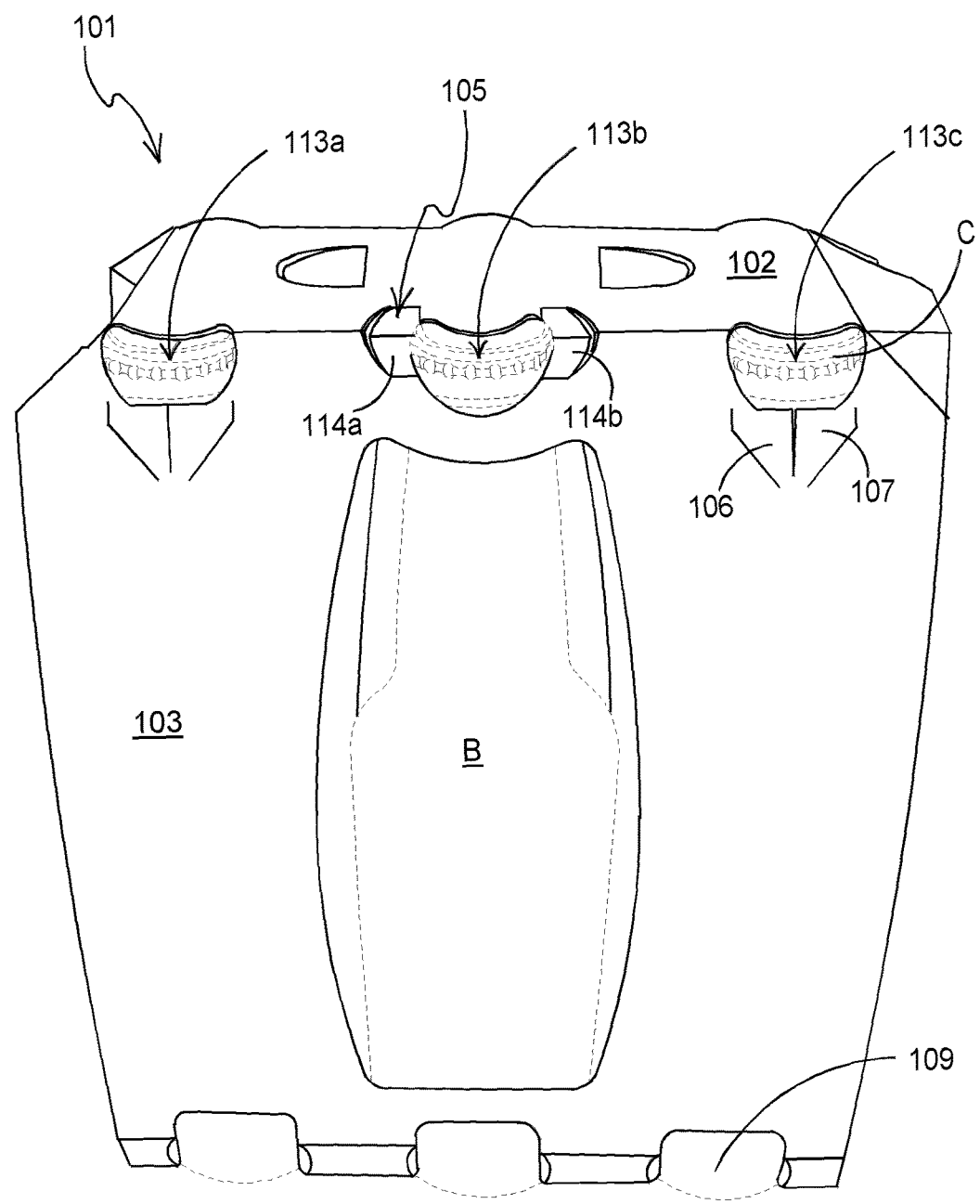
FIG. 2 is a perspective view from above of second exemplary carton forming a package.

Referring now to FIG. 2, there is shown an alternative, second, carton embodiment which may be employed with the present invention. In the second carton embodiment, like numerals have, where possible, been used to denote like parts, albeit with the addition of the prefix "100" to indicate that these features belong to the second carton embodiment. The alternative embodiment shares many common features with the first embodiment and therefore only the differences from the embodiments illustrated in FIG. 1 will be described in any greater detail.

The endmost crown apertures 113a, 113c in first side panel 106 and each of the crown apertures in second side panel comprise a plurality of cut lines defining in part a pair of tabs 106, 107. Tabs 106, 107 are substantially triangular in shape and are separated by cutline. Tabs 106, 107 fold when an article B is received in the endmost crown apertures 113a, 113c.

Crown aperture 113b forms part of an article securing structure 105 which also comprises a pair of engagement tabs 114a, 114b disposed on opposing sides thereof. Each tab 114a, 114b is struck in part from top panel 102 and in part from first side panel 103. Each tab 114a, 114b is defined: in part by an arcuate cut line; in part by crown aperture 113b; in part by a pair of fold lines; and in part by a linear cut line. A first fold line extends from a first end of each arcuate cut line disposed in first side panel 103 and extends to crown aperture 113b. Each linear cut line is disposed in top panel 102 and extends from crown aperture 113b substantially perpendicularly with respect to the fold line which hinges the first side panel 103 to the top panel 102. A first end of each linear cut line preferably intersects a vertex defined by the between the first side panel 103 and the top panel 102 and a cut line defining the crown aperture 113b. A second fold line extends between a second end of each arcuate cut line and a second end of each respective linear cut line. Preferably, fold line between the first side panel 103 and the top panel 102 bisects each engagement tab 114a, 114b.

Crown apertures 113a, 113b, 113c receive an upper portion of the article B as shown in FIG. 2. The engagement tabs 114a, 114b are folded inwardly of the carton on opposing sides of the closure C of the article B. An engaging edge of each tab 114a, 114b engages a respective side of the article closure C, adjacent to a radial protrusion of the closure C such that the tabs 114a, 114b prevent rotation of the article B within the carton. In some embodiments the engagement tabs 114a, 114b engage between a pair of radial protrusions extending from the article B, optionally only one engagement tab 114a, 114b may be provided to prevent rotation of the article clockwise and counter-clockwise. The engagement tabs 114a, 114b fold about the fold line between the first side panel 103 and the top panel 102.

Each crown aperture 113a, 113b, 113c is struck in part from a respective one of the first side panel 103 or second side panel and in part from the top panel 102, so as to define an arcuate shaped tab which extends over an uppermost portion of a respective article B which it receives.

Optionally, the top panel 8 comprises two optional finger apertures 74 that may be utilised by a user to carry the carton.

A carton 101 may be set up from a blank through a series of folding operations in substantially the same manner as described above in relation to the carton of FIG. 1.

The cartons 1, 101 of FIGS. 1 and 2 each comprise an article securing structure 5, 105 for securing the orientation of at least one article within the respective package 1, 101. FIGS. 3 to 8 illustrate a machine and method for orientating an article within a carton for example, but not limited to, the carton of FIGS. 1 and 2.

Preferably, the ends of the carton are at least partially closable, FIG. 2 illustrates a carton in which one end of the carton has been closed and the other end is in an open condition. To prevent the articles B from being removable through ends to the tubular structure of the carton, end closure arrangements are folded such that an end flap at least partially close the end of the carton.

Figure 3:
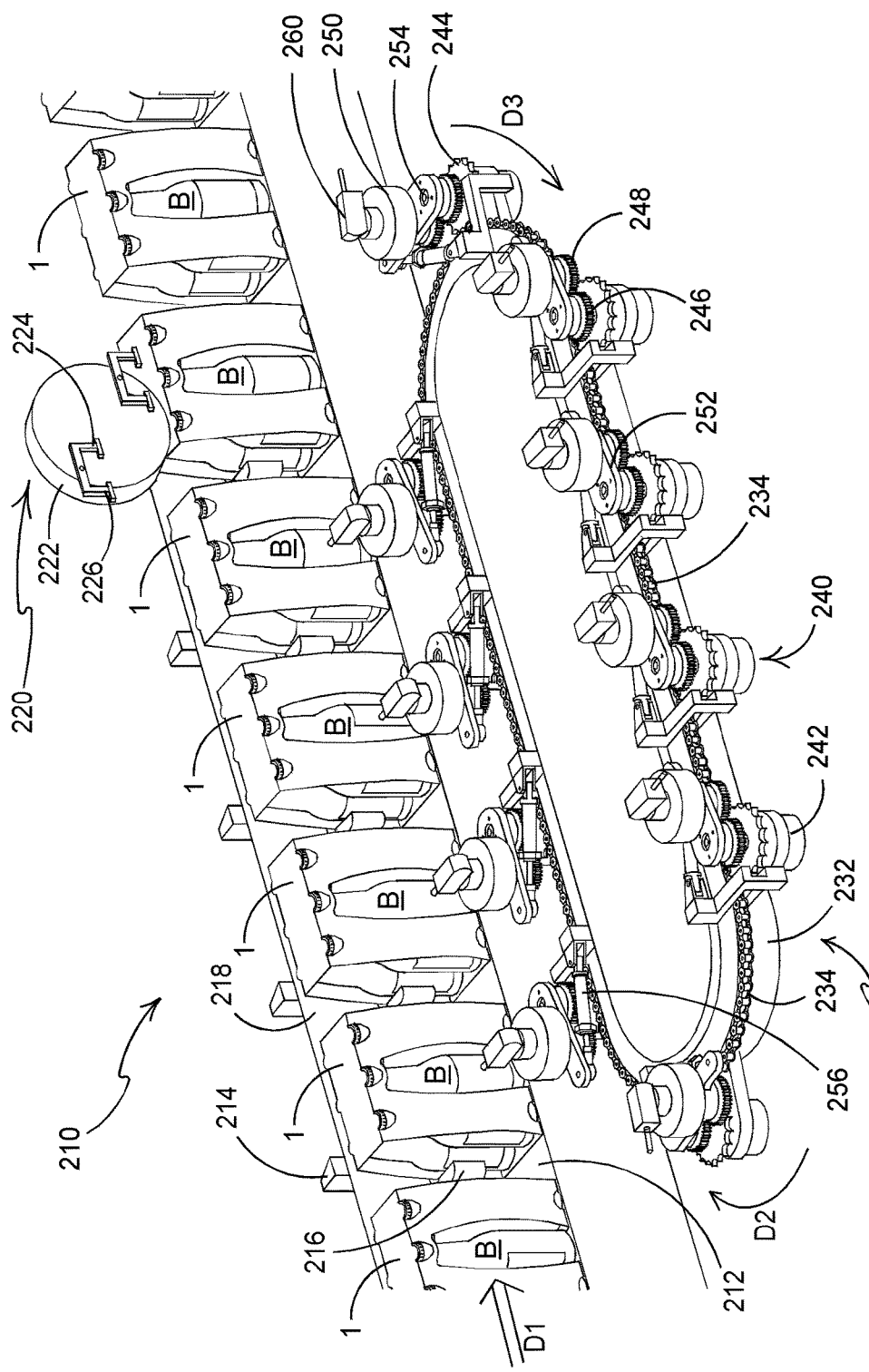
FIG. 3 is a perspective view from above of packaging machine according to a first embodiment of the present invention.

FIG. 3 illustrates a packaging machine 210 for forming a part of a packaging line, in which the orientation of an article B presented in the display window 4, 104 of the carton is controlled at an orientation station 230. The article B comprises at least one visible indicia $I_2$ for being displayed to a consumer. Optionally, the indicia $I_2$ is provided upon a label $L_B$ mounted on the article B. The label $L_B$ is visible through the display window 4, 104. The article B may also comprise an optional upper label $L_T$ as shown in FIG. 1. The article B may also comprise an alignment indicia $I_1$, optionally provided upon the label $L_B$.

Packages 1 are conveyed upon a first conveyor 212 in the direction indicated by direction arrow D1. The packages are orientated upon the conveyor 212 such that a tubular axis of the carton is substantially parallel to the direction of travel, the window panels 10a, 10b are disposed substantially transversely across the conveyor, that is to say perpendicularly to the direction to travel D1, in this way the, or—in embodiments having two or more display windows—each, display window 4 is accessible from a side of the conveyor 212.

Figure 5:
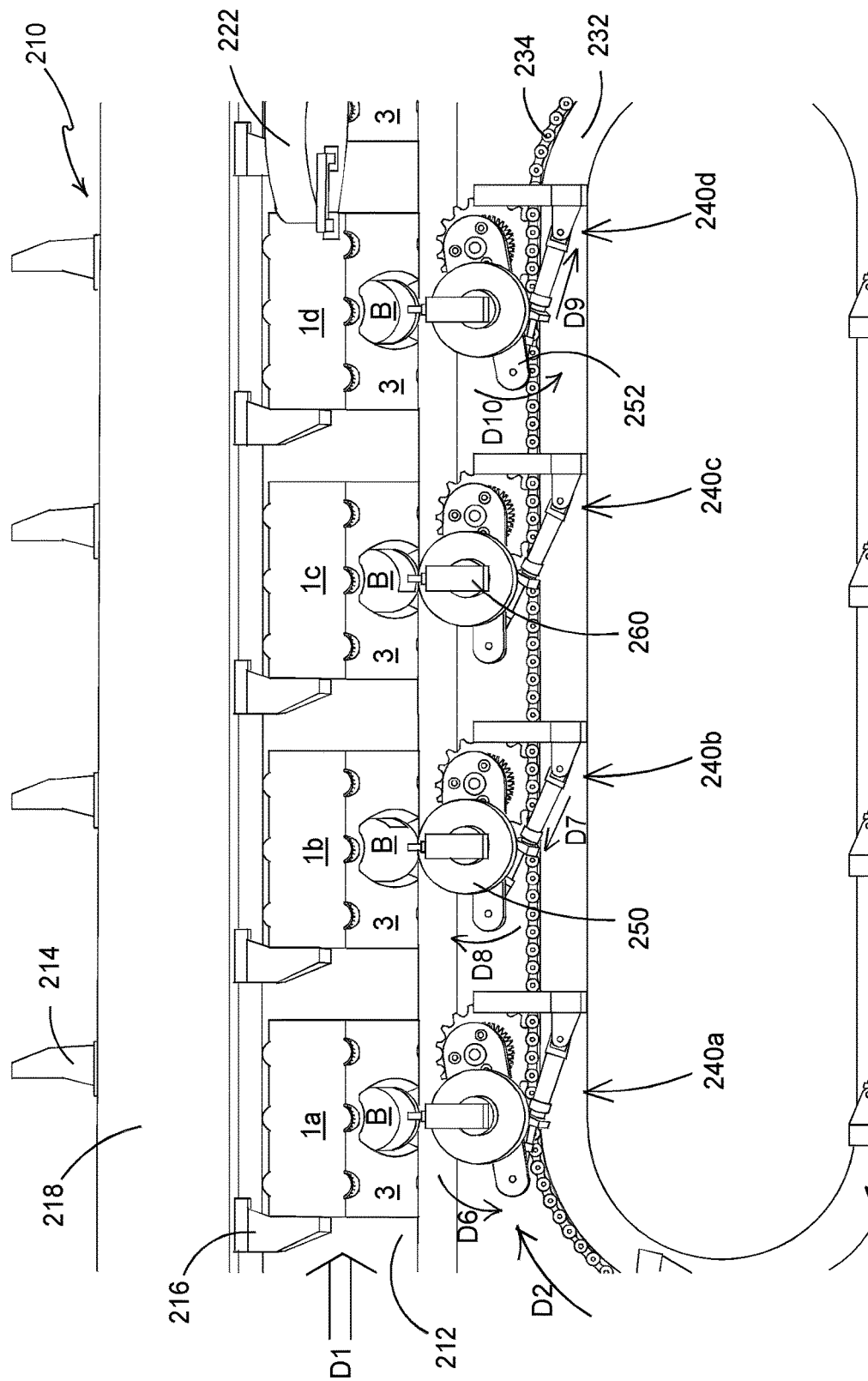
FIG. 5 is a plan view from above of a working reach of the packaging machine of FIG. 3.

A second conveyor 218, best illustrated in FIG. 5, is disposed upon a first side of the conveyor 212 in parallel thereto. Second conveyor 218 is mounted alongside the first conveyor 212 and is perpendicularly orientated with respect to the first conveyor 212 such that the second conveyor forms a moving wall which prevents the packages 1 from being pushed over the first side of the first conveyor 212. In other embodiments a fixed guide rail may be provide to retain the packages 1 in addition to or replacement of the second conveyor 218. The second conveyor 218 comprises flight bars 214, 216 which are mounted to the second conveyor 218. The flight bars 214, 216 are disposed in between the packages 1 and engage with a trailing edge of each package 1 whereby metering the packages 1, such that the packages 1 are disposed at a predefined pitch upon the first conveyor 212. The flight bars 214, 216 may also assist in propelling the packages 1 through the orientation station 230.

The orientation station 230 comprises a mechanism which controls or adjusts the orientation of the article B located in the display window 4 of each package 1. The mechanism comprises a third conveyor 232 upon which a plurality of carriages 240 are mounted. The orientation station 230 comprises a first upstream, end and a second downstream end, the conveyor 232 comprises a working reach during which the carriages 240 adjust the orientation of an article B and a return reach for returning each carriage 240 from the second downstream end of the orientation station 230 to the first upstream end of the orientation station 230. The third conveyor 232 is mounted upon sprockets or other suitable drive wheels (not shown) which are coupled to a drive mechanism such as an electric motor. The third conveyor 232 moved the carriages in a clockwise direction such that the working reach of the third conveyor 232 is moving in direction D1, the same as the first conveyor 21 and hence the packages 1.

The mechanism also comprises a stationary chain or belt 234; in other embodiments the chain 234 may be replaced with a rack comprising teeth. Preferably, in those embodiments employing a belt the belt comprises teeth. It will also be appreciated that the chain or belt 234 need not extend along the return reach of the conveyor 232. It will also be appreciated that in other embodiments that the chain may not be stationary, the chain 234 may be moving at different speed relative to the third conveyor 232 and/or carriages 240, the chain may be rotated in direction opposite to that of the third conveyor 232 and/or carriages 240.

In yet other embodiments the third conveyor 232 may be omitted, each carriage 240 may comprise a drive motor for driving the carriages about the chain 234.

The packaging machine 210 also comprises a locking device engagement mechanism 220 disposed overhead the first conveyor 212. The locking device engagement mechanism 220 comprises a wheel 222 on which are mounted pairs of fingers 224, 226. The pairs of fingers 224, 226 are arranged so as to engage with the article securing structure 5, 105 so as to engage with engagement tabs 114a, 114b so as to lock the orientation of the article B disposed within the display window 4.

Figure 4:
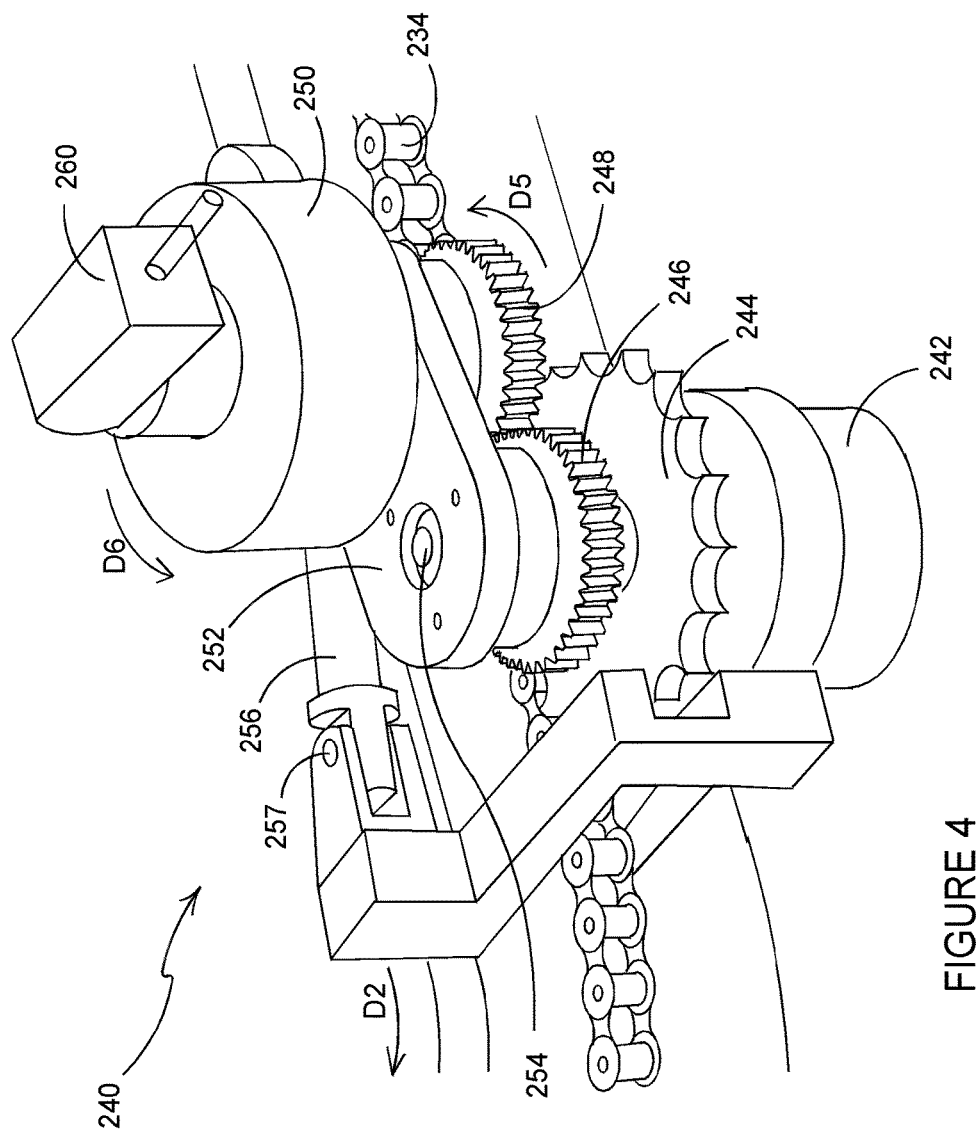
FIG. 4 is an enlarged perspective view from above of a portion of the packaging machine of FIG. 3.

Referring now to FIG. 4 there is shown an enlarged view of the carriage 240; the carriage comprises a body 242 which is coupled to the third conveyor 232. A sprocket 244 meshes with the chain 234; the sprocket 244 is rotatably mounted to the body 242 by a spindle 254. The carriage 240 comprises a first gear wheel 246 mounted upon the spindle 254, preferably above the sprocket 244. A swing arm 252 is pivotally mounted above the first gear wheel 246 about an upper end of the spindle substantially at one end of the swing arm 252 such that the swing arm is pivotally moveable with respect to the body 242. The first gear wheel 246 and sprocket 244 are rotatable with respect to the swing arm 252. Optionally, the swing arm 252 is coupled to the spindle by a bearing. A second gear wheel 248 is coupled to the swing arm 252 by a second spindle (not shown); the second spindle is rotatably mounted to the swing arm and the second gear wheel 248 is mounted below the swing arm 252 such that teeth on the second gear wheel 248 mesh with teeth on the first gear wheel 246. In other embodiments the first and second gear wheels 246, 248 and/or the sprocket may be mounted above the swing arm 252.

A friction wheel 250 is mounted above the swing arm 252 and is coupled to the second gear wheel 248 such that when the second gear wheel 248 rotates the friction wheel rotates at the same speed and in the same direction, as indicated by direction arrows D5 and D6.

Driving the carriage 242 about an endless path defined by the third conveyor 232 causes rotation of the sprocket 244, since the sprocket 244 is in engagement with the chain 234, which chain 234 is stationary. This is turn causes the friction wheel 250 to be rotated due to fact that the sprocket 244 is coupled the friction wheel 250 by the first gear wheel 246 and the second gear wheel 248. It will be appreciated that in some embodiments the chain 234 may not be stationary and that the chain 234 may also be driven, for example by a sprocket coupled to an electric motor, the chain 234 may be moving at a different speed or velocity to the speed or velocity of travel of the carriages 240 such that the relative movement between the chain 234 and the carriages 240 causes a rotation of the sprocket 244 and hence rotates the friction wheel 250. It will be appreciated that the chain 234 may be travelling or circulating in a direction opposing the direction of travel D2 of the carriages 240. It will also be appreciated that if the chain 234 is driven in the same direction as the carriages 240 and at a greater speed than the carriages 240 the direction of rotation of the sprocket 244 and hence friction wheel 250 may be opposite to that illustrated. The direction of rotation of the friction wheel 250 may also be determined by the number of gear wheels 246, 248 which are provided. The first gear wheel 246 and the second gear wheel 248 may be coupled to one another by yet another belt or chain and need not be in direct contact with each other.

A sensor 260 is mounted above the friction wheel 250; the orientation of the sensor is preferably fixed with respect to the body 242 and the swing arm 252. The sensor 260 is orientated such that when the friction wheel 250 is brought into contact with an article B in a package 1, during the working reach of the third conveyor 232, the sensor 260 can read information provided upon the article B. In the illustrated embodiment the swing arm 252 is substantially parallel to the first conveyor 212 when friction wheel 250 is in engagement with an article B in a package 1, the sensor 260 is mounted substantially perpendicularly to the swing arm 252 such that the sensor faces the article B disposed in the display window 4 of the package 1.

Figure 6:
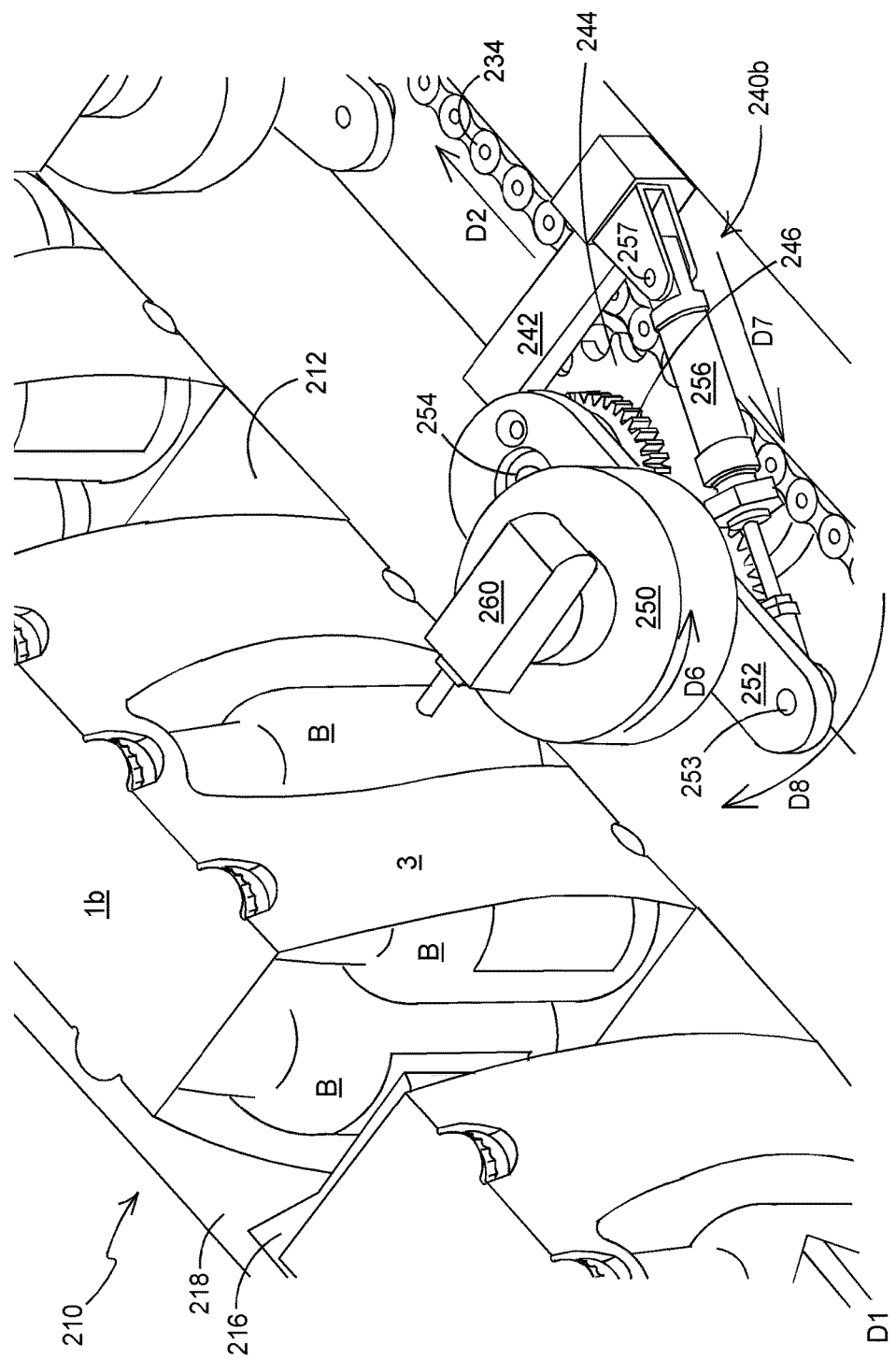
FIG. 6 is an enlarged perspective view from above of a portion of the packaging machine of FIG. 3 in a first, operative, condition.

A piston and cylinder arrangement 256 is mounted between the swing arm 252 and the body 242. A first end of the cylinder is pivotally coupled to the body 242 by a pivotal connection 257. A first end of the piston is received in the cylinder at a second end thereof; the second end of the piston is pivotally coupled, at 253, to the swing arm 252, as best illustrated in FIGS. 5 and 6. The piston is preferably pneumatically driven but in some embodiments it is envisaged that the piston may be driven hydraulically or electrically. It is envisaged that the cylinder may be a single acting piston, in which case a biasing means may be provided for biasing the piston and/or swing arm 252. Preferably, the piston or swing arm 252 is biased towards a disengaged position in which the piston is retracted. In other embodiments the cylinder may be a double acting cylinder in which the piston may be extended and retracted by pneumatic, hydraulic, electric or other suitable means.

Figure 7:
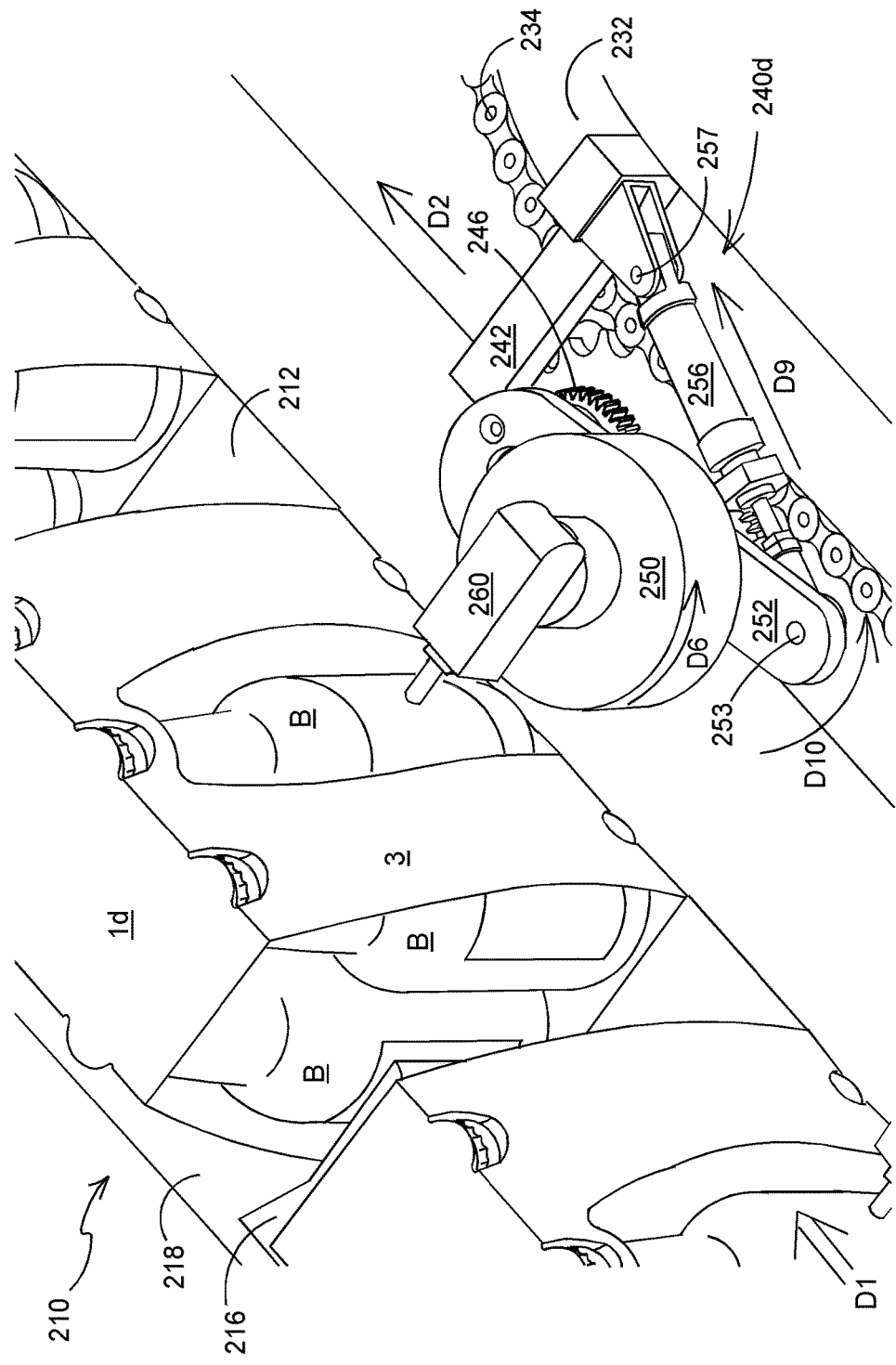
FIG. 7 is an enlarged perspective view from above of a portion of the packaging machine of FIG. 3 in a second, disengaged, condition.
Figure 8:
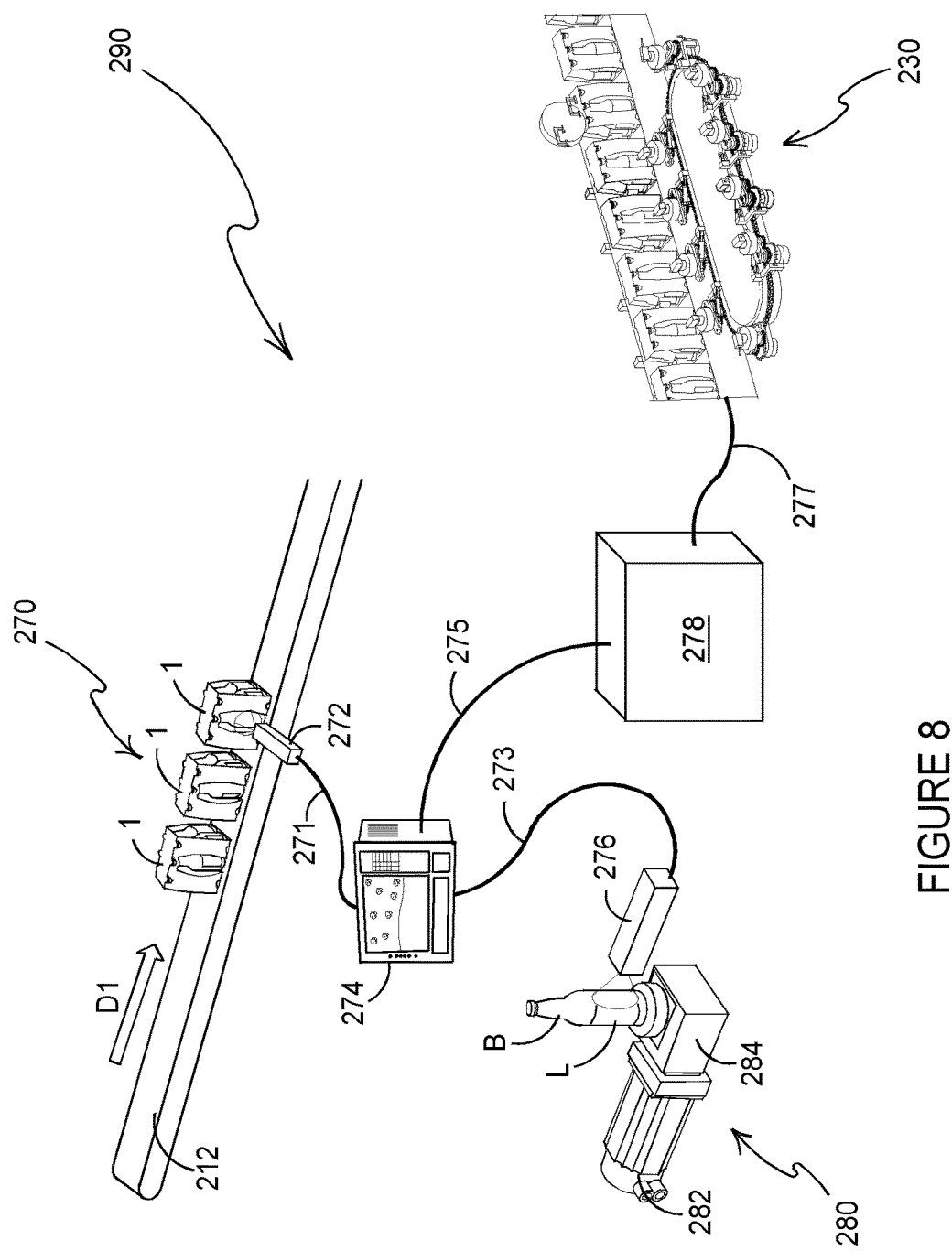
FIG. 8 is a schematic illustration of a system and method of packaging article according to a first embodiment of the present invention.

Operation of the orientation station 230 and a method of orientating articles B will now be described with reference to the Figures in particular FIGS. 5 to 8. FIG. 8 illustrates a system for a packaging machine to learn about an article B for being displayed in the package 1 and for determining and adjusting as necessary the orientation of the article B. In a learning station 280 an article B is loaded upon a rotatable platform 284 coupled to drive motor 282. A camera 276 or other suitable sensor records an image or other data regarding the article B. In the illustrated embodiment the article B comprises a label L which the camera 276 records as the article B is rotated upon the platform 284. In other embodiments the camera 276 may record an image of the entire article B. The label L may be omitted. The camera 276 may be mounted on a rotation device such that the camera 276 is rotated about the article B. The data recorded by the camera 276 is received by controller 274. Preferably, a wired connection is provided between the camera 276 and the controller 274; in some embodiments the controller 274 may be wirelessly coupled to the camera 276. In yet other embodiments the camera 274 and drive motor 282 are coupled to the controller 274.

In further embodiments the drive motor 282 and/or camera 276 are coupled to a separate recording device which stores data on a memory device or storage media such as, but not limited to, EPROM, EEPROM, Flash memory, mask Rom, CD, CDROM, DVD, BD-ROM (Blu-ray) CD-R, DVD-R, DVD+R, BD-R, CD-RW, DVD-RW, DVD+RW, DVD-RAM, BD-RE, Magnetic disk (Floppy disk, Hard disk drive), Magnetic tape or other suitable storage media. The memory device or storage media may be employed to transfer the data from the recording device to the controller 274.

The controller 274 is coupled to a sensor 272 such as, but not limited to, a camera or photo detector (photocell or photo resistor). The sensor is disposed at a reading station 270; the reading station 270 is disposed upstream from the orientation station 230. The sensor 272 collects information about each article B disposed in the display window 4 of the packages 1 the information is received at the controller 274. The controller 274 can compare the information received with data stored in memory regarding the article B. The controller 274 can determine whether the article B is disposed in a predefined desired orientation.

In some embodiments the controller 274 calculates the required angle through which each article B needs to be rotated in order to be disposed in the predefined desired orientation. In such embodiments the controller 274 tracks the position of each article B upon the conveyor 212 and instructs an appropriate one of the friction wheels 250 to engage with an article B in each package 1 for an appropriate amount of time in order to affect the required angle of rotation of the article B. In other embodiments the controller 274 calculates a parameter indicative of an angle through which the article B is required to be rotated in order to place the article B in the desired orientation. The parameter may be: a distance of the working reach of the third conveyor 232 over which the friction wheel 250 is required to be in contact with the article B, and angle of rotation of the article B, or a number of rotations or part rotations that the friction wheel 250 must rotate whilst in contact with the article B, or some other suitable parameter.

In other embodiments the controller 274 can be instructed to look for a predefined feature of the article B which acts as an alignment indicia, the alignment indicia may be specifically provided upon the article B for example by printing on a label L, or may be a suitable indicia provided on the article B for providing information to a consumer for example an edge of a label, a branding feature such as a logo or brand name of the product disposed within the article B. In such embodiments the controller 274 instructs an appropriate one of the friction wheels 250 to engage with an article B in each package 1 until the sensor 260 detects the predefined feature. In some embodiments the controller 274 may detect, via the sensor 260, the predefined feature and actuates the requisite piston and cylinder arrangement 256 so as to engage the respective friction wheel 250 with the article B for a predefined period of time following detection of the predefined feature, such that the article B is disposed in the desired orientation.

Preferably, the controller 274 is coupled to the orientation station 230 via control unit 278 which controls and monitors the carriages 240 in the orientation station, the control unit 278 controls the third conveyor 232 in particular the drive motor and may monitor one or more electrical parameters of the drive motor and each piston/cylinder arrangement 256. In other embodiments the controller 274 and control unit 278 are integrated together.

Referring to FIG. 5, there is shown an enlarged view of the working reach of the third conveyor 232; carriages 240a, 240b, 240c, 240d are illustrated at different positions in the working reach of the third conveyor 232. A first Carriage 240a is shown at the start of the working reach of the third conveyor 232. The piston is retracted within the cylinder such that the swing arm 252 is also retracted with respect to the first conveyor 212. The first carriage 240a has been arranged to bring its friction wheel 250 into registry with the article B in the display window 4 of a first package 1a. The carriage sensor 260 or the upstream sensor 272 interrogates the position of the article B in the display window 4, if the controller 274 determines that the article B is correctly aligned it will allow the first package 1a to pass through the orientation station 230 without activating the piston/cylinder arrangement 256 of the first carriage 240a.

If the controller 274 determines that an article B in the display window 4 of a second package 1b is incorrectly aligned, the controller 274 instructs the piston/cylinder arrangement 256 of a second carriage 240b to extend such that the swing arm 252 pivots toward the first conveyor 212, as shown by direction arrow D8, in FIGS. 5 and 6, thus engaging the friction wheel 250 of the second carriage 240b with the article B in the display window 4 of the second package 1b. The second carriage 240b moves through the working reach of the orientation station 230 in the direction indicated by direction arrow D2. The second carriage 240b is conveyed in synchrony with the second package 1b. The sprocket 244 rotates in the direction indicated by direction D4. The first gear wheel 246 also rotates in the direction indicated by direction arrow D4, and the second gear wheel 248 rotates in an opposite direction as indicated by direction arrow D5, as shown in FIG. 4. The friction wheel 250 rotates in the same clockwise direction as the second gear wheel 248, as indicated by direction arrow D6 in FIGS. 4 and 5. The article B rotates in an anticlockwise direction, an opposite direction to the direction of rotation of the friction wheel 250.

The controller 274 maintains the friction wheel 250 in contact with the article B for a period of time which has been calculated by the controller 274 as shown by third package 1c and third carriages 240c. The period of time is dependent upon the starting position or initial orientation of the article B as determined by the carriage sensor 260, or by the upstream sensor 272; the period of time is dependent upon the desired orientation of the article B which is predefined and stored in a memory device of the controller 274 and the period of time is dependent upon speed of rotation of article B which is achieved by the friction wheel 250. In alternative embodiments the controller 274 disengages the friction wheel 250 from contact with the article B in response to a signal received from the carriage sensor 260, for example the carriage sensor 260 detects a feature of the article B which is employed or provided as an alignment aid.

After the friction wheel 250 has been in contact with the article B for the calculated period of time, or alternatively once the signal is received from the carriage sensor 260, the controller 274 instructs the piston to retract within the cylinder as indicated by direction arrow D9. Retracting the piston causes the swing arm 252 to be pivotally moved away from the first conveyor 212, as shown by direction arrow D10, thus disengaging the friction wheel 250 from the article B as shown in FIGS. 5 and 7 by package 1d and fourth carriage 240d.

In the illustrated embodiment the friction wheel 250 is shown engaging with the article B through the display window 4, preferably below the label $L_B$ or other display feature, in alternative embodiments it is envisaged that the friction wheel 250 may engage with the article B through the aperture 9 forming part of the heel engagement structure, this has the advantage that the friction wheel 250 does not contact the portion of the article B which it is desired to display in the display window 4 whereby preventing or at least reducing damage to the article B for example the label $L_B$.

Once the articles B have been placed in the desired orientation by the friction wheel 250 the packages 1 pass to a locking station 220. The locking station 220 comprises an overhead mechanism including a conveyor or wheel 222 to which tool heads 224/226 are mounted the tool heads 224/226 comprise a pair of fingers 224, 226 which engage with the article securing structure 5, 105 provided on the carton 1, 101. Each finger 224, 226 engages with a respective one of the engagement tabs 114a, 114b so as to press the engagement tabs 114a, 114b inwardly of the tubular structure of the carton, the engagement tabs 114a, 114b are placed in locking engagement with a portion of the article B, for example each tab 114a, 114b may engage between a paid or substantially vertical protrusions extending outwardly from a closure of the article B such as a crown cork or crown cap. The engagement tabs 114a, 114b inhibit rotation of the article B after the package leaves the locking station 220 thereby maintaining the orientation of the article B within the display window 4.

The piston/cylinder arrangement 256 can compensate for movement or irregularities in the shape of the article B whilst the friction wheel 250 is in engagement with the article B. The piston is extended or retracted during the working reach of the third conveyor 232 so as to ensure that the friction wheel 250 is kept in frictional contact with the article B until the controller 274 determines that the article B is orientated in the predefined desired orientation. The mechanism may include one or more sensors to ensure that the friction wheel 250 is in contact with the article B, for example the friction wheel 250 may comprise one or more contact sensors which sense contact, or lack of contact, between the friction wheel 250 and the article B, in other embodiments the sensor may monitor a parameter of the piston/cylinder arrangement 256 such as pressure or flow of the fluid in the cylinder.

It can be appreciated that various changes may be made within the scope of the present invention, for example, the size and shape of the panels and apertures may be adjusted to accommodate articles of differing size or shape. In alternative embodiments it is envisaged that the sprocket 244 may be replaced with a second friction wheel which is in frictional contact with a surface wherein there is relative movement between the second friction wheel and the surface so as to cause the second friction wheel to rotate which in turn causes first friction wheel 250 to rotate. The friction wheel 250 may be replaced or supplemented with a belt mounted on a driven wheel (which may be the friction wheel 250) and an idler wheel wherein the belt is moved into frictional contact with the article B to cause it to rotate.

It will be recognised that as used herein, directional references such as "top", "bottom", "front", "back", "end", "side", "inner", "outer", "upper" and "lower" do not limit the respective panels to such orientation, but merely serve to distinguish these panels from one another.

As used herein, the terms "hinged connection" and "fold line" refers to all manner of lines that define hinge features of the blank, facilitate folding portions of the blank with respect to one another, or otherwise indicate optimal panel folding locations for the blank. A fold line is typically a scored line, an embossed line, or a debossed line. Any reference to hinged connection or fold line should not be construed as necessarily referring to a single fold line only; indeed it is envisaged that hinged connection can be formed from any one or more of the following, a short slit, a frangible line or a fold line without departing from the scope of the invention.

As used herein, the term "severance line" refers to all manner of lines that facilitate separating portions of the substrate from one another or that indicate optimal separation locations. Severance lines may be frangible or otherwise weakened lines, tear lines, cut lines, or slits.

It should be understood that hinged connection, severance lines and fold lines can each include elements that are formed in the substrate of the blank including perforations, a line of perforations, a line of short slits, a line of half-cuts, a single half-cut, a cut line, an interrupted cut line, slits, scores, any combination thereof, and the like. The elements can be dimensioned and arranged to provide the desired functionality. For example, a line of perforations can be dimensioned or designed with degrees of weakness to define a fold line and/or a severance line. The line of perforations can be designed to facilitate folding and resist breaking, to facilitate folding and facilitate breaking with more effort, or to facilitate breaking with little effort.

The invention claimed is:

1. A packaging machine comprising an orientation system for orientating an article within a package, the orientation system comprising:
   at least one carriage moveable about an endless path, the endless path comprising a working reach and a return reach;
   a drive mechanism for propelling the at least one carriage about the endless path;
   an engagement member for frictionally engaging with and rotating the article in the package, the engagement member being moveable between an engaged position and a disengaged position;

wherein the engagement member is rotationally driven by a rotary drive mechanism comprising;
a first component rotationally mounted to the at least one carriage; and
a second component;
wherein the second component engages with the first component such that the first component rotates as the at least one carriage is driven about the endless path, and wherein the engagement member is coupled to the first component by at least one pair of gear wheels such that a direction of rotation of the engagement member is opposite to a direction of rotation of the first component.

2. The packaging machine according to claim 1 wherein the orientation system comprises a controller coupled to a sensor for collecting information concerning the orientation of the article in the package and coupled to an actuator for moving the engagement member between the engaged position and the disengaged position.

3. The packaging machine according to claim 2 wherein the controller comprises a memory device for storing reference information about the article, and a processor for comparing the information from the sensor with reference information stored in the memory device.

4. The packaging machine according to claim 3 wherein the controller comprises a calculator for calculating a parameter indicative of an angle through which the article disposed within the package is required to be rotated in order to place the article in a predefined orientation.

5. The packaging machine according to claim 4 wherein the parameter is one of the following: a time period for which the engagement member is to be engaged with the article; a distance for which the engagement member is to be engaged with the article; an angle through which the article disposed within the package is required to be rotated; a number of rotations of the engagement member.

6. The packaging machine according to claim 2 comprising a learning station coupled to the controller wherein the learning station comprises a recorder for recording the appearance of at least some of the article.

7. The packaging machine according to claim 6 wherein the learning station comprises a rotation platform for rotating the article through at least one full rotation whilst recording an image of the article.

8. The packaging machine according to claim 1 wherein the drive mechanism comprises a chain or belt driven by an electric motor via a drive wheel or sprocket.

9. The packaging machine according to claim 1 wherein the drive mechanism comprises an electric motor mounted to the carriage and coupled to the first component of the rotary drive mechanism.

10. The packaging machine according to claim 1 wherein the engagement member comprises a friction wheel mounted upon a swing arm which is pivotally coupled to the carriage.

11. The packaging machine according to claim 10 wherein an actuator is pivotally coupled at one end to the swing arm and is pivotally coupled at a second opposing end to the carriage.

12. The packaging machine according to claim 11 wherein the actuator comprises a piston and a cylinder.

13. The packaging machine according to claim 12 wherein the piston is coupled to the swing arm and the cylinder is coupled to the carriage.

14. The packaging machine according to claim 12 wherein the cylinder is a single acting cylinder.

15. The packaging machine according to claim 12 wherein the cylinder comprises a biasing device for biasing the piston towards a retracted position within the cylinder.

16. The packaging machine according to claim 12 wherein the cylinder is a double acting cylinder for driving the piston from a retracted to an extended position and from the extended position to the retracted position.

17. The packaging machine according to claim 12 wherein the piston and cylinder are driven pneumatically, hydraulically or electrically.

18. The packaging machine according to claim 1 wherein the second component of the rotary drive mechanism comprises a chain, toothed belt or rack.

19. The packaging machine according to claim 1 wherein the first component of the rotary drive mechanism comprises a sprocket or gear wheel, or friction wheel for engaging with the second component of the rotary drive mechanism.

* * * * *